2,954,929

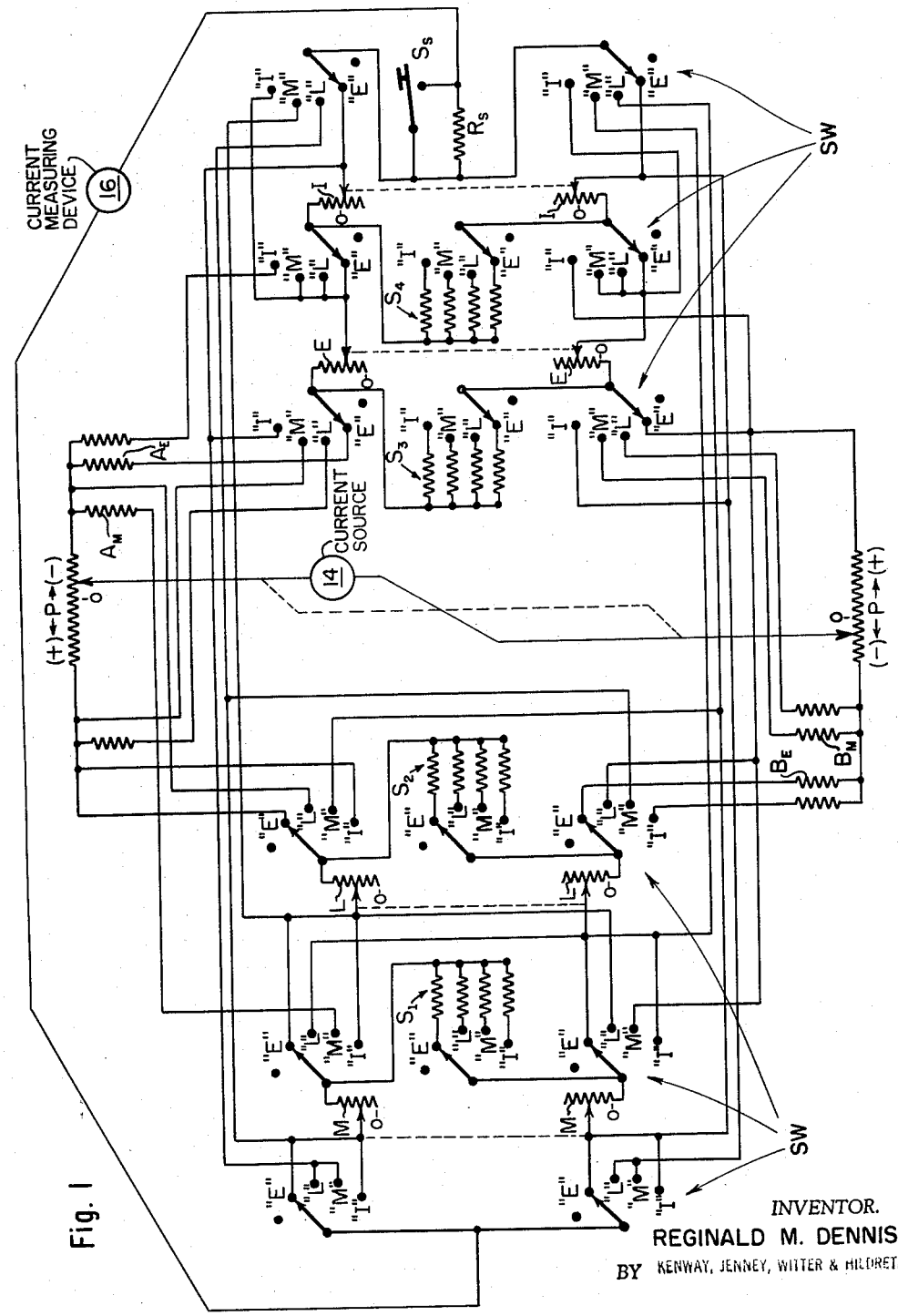

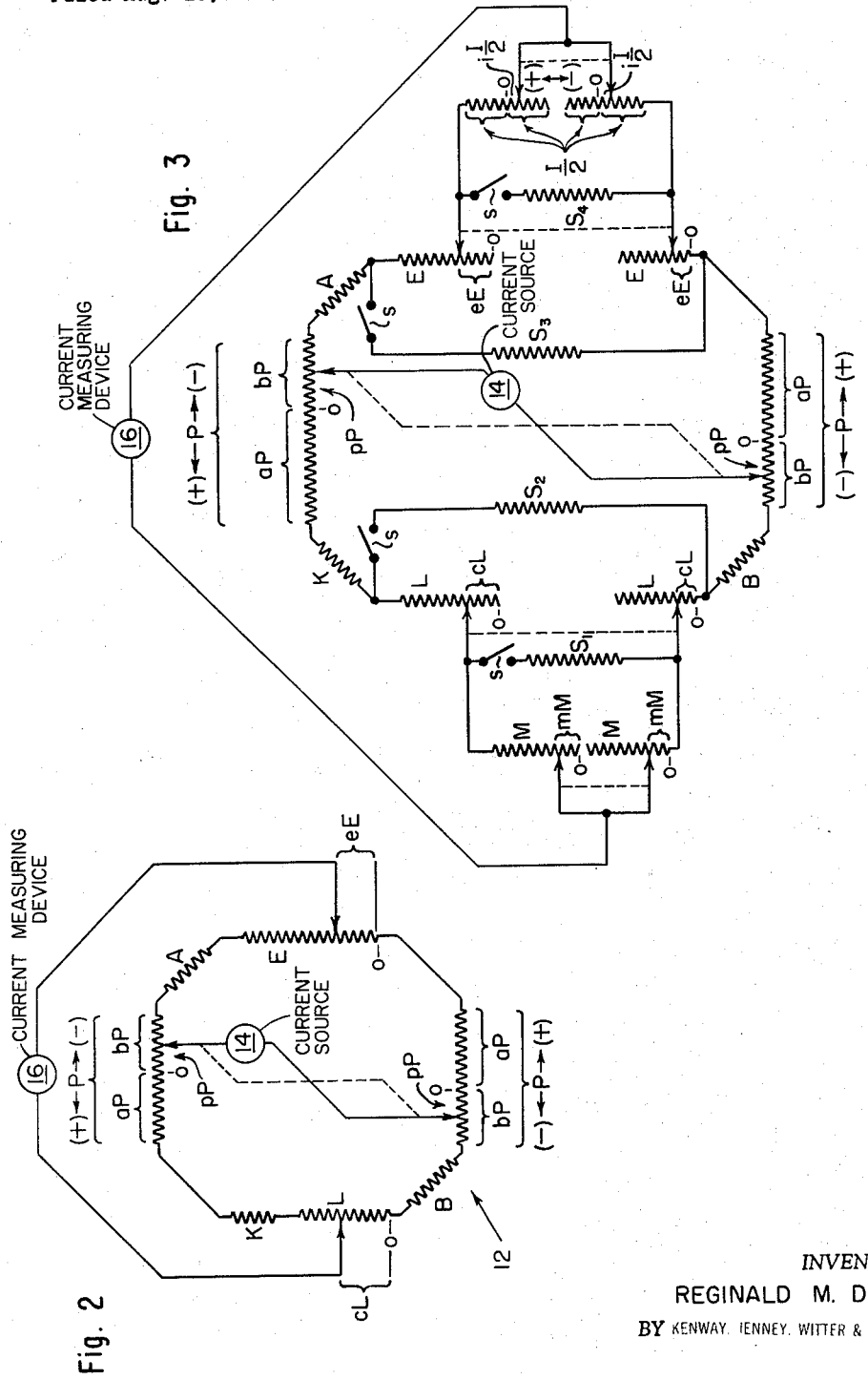

LOSS COMPUTER

Reginald M. Dennis, Milton, Mass.

Filed Aug. 15, 1957, Ser. No. 678,365

1 Claim. (Cl. 235—179)

The present invention relates generally to apparatus for computing sums of a plurality of linear variables. More particularly, it is concerned with an impedance bridge circuit which, at balance, provides a dial indication of such a sum. This circuit is useful in deriving informaton for utility power system operation, and specifically in determining the most economical distribution of loads between generating stations and systems.

A typical electrical power system includes one or more generating stations, usually geographically separated, and a connection called a "system interchange" whereby power may be brought from or delivered to another system. Systems so joined form a "network." A principal object of this invention, as seen with reference to a particular system, is to provide apparatus to determine the most efficient allocation of the load at any given moment among each of its generating stations and the system interchange.

Another object is to provide apparatus capable of rapid determinations, thus permitting frequent redistributions of the load as it varies, in the interest of obtaining maximum economy in system operation.

A further object is to reduce the labor of deriving accurate information for the above purposes.

A still further object is to provide apparatus of modest cost and size and of sturdy construction capable of performing the necessary computations without substantial requirements of adjustment, calibration or maintenance.

With the foregoing and other objects in view, the features of the invention include the use of a bridge circuit which, by null-point detection, derives the solutions of linear equations involving multiple variables which are a function of the existing load allocation. Such solutions are subsequently used to derive ultimate data which may be interpreted to measure the need for a new allocation under the existing load.

Another feature resides in the adaptability of the bridge circuit for accommodation of any desired number of generating stations and interchanges according to the particular system under study.

Still another feature is the independence of the bridge circuit from variations in its supply voltage.

Other features of the invention reside in certain circuit arrangements and modes of operation which will be clearly understood by reference to the following description of a preferred embodiment thereof, having reference to the appended drawings illustrating the same, in which Fig. 1 is a schematic circuit diagram showing the complete circuit of a typical computer according to a preferred form of the invention, and Figs. 2 and 3 are circuit diagrams of simplified bridge circuits used to explain the principles of the circuit of Fig. 1.

*Derivation of delivered power cost*

A fundamental of power system operation is that, where there are a plurality of power sources in a given system, either in the form of generating stations or network interchanges, the system operates at maximum efficiency when each source delivers its power to the load center of the system at the same "incremental delivered power cost." For a generating station this cost is derived from considering both the "incremental production cost" of power delivered to the busses at the station and the "incremental transmission loss" involved in transmitting the power to the load center of the system. For an interchange the "incremental production cost" is the rate at which power is delivered at the interchange.

To determine the "incremental delivered power cost" for each source, a formula has been derived by methods and apparatus with which the present invention is not directly concerned. This formula expresses the "incremental transmission loss" in the generalized form of a polynomial consisting of linear functions of the power output or input of each source in the system, plus a constant. This invention is concerned with the computation of this formula for each source. Once the computation has been completed, the results may be combined on a slide-rule device with data involving the "incremental production cost" to find the "incremental delivered power cost."

We are given a typical formula for the "incremental transmission loss" of a power station E in a network of three stations E, L and M and a net interchange I, as follows:

(1) $$\frac{dP_L}{dP_1} = 2P_1 B_{11} + 2P_2 B_{12} + 2P_3 B_{13} + 2P_4 B_{14} + B_{10}$$

where $P_1$, $P_2$ and $P_3$ are the power outputs in suitable units of stations E, L and M, $P_4$ is the power delivered to or from the system at the net interchange (with a plus sign for power delivered to the system and a minus sign for power delivered from it), and the B-terms are constants which may have plus or minus signs. The formulae for the other stations and for the net interchange are of the same general form, and the procedure involved in solving one formula applies to all.

Equation 1 may be rewritten to express the P-terms as functions of an assumed maximum capacity for each station and the interchange. Let us further assume that in the assumed case of station E the terms $B_{12}$ and $B_{13}$ are negative and the terms $B_{11}$, $B_{14}$ and $B_{10}$ positive. Combining the constants in each term, we then obtain (2) $$\frac{dP_L}{dP_1} = eE - mM - cL \pm \frac{iI}{2} + B_{10} \text{ for station E}$$

where:

$E = 2B_{11}$ times the assumed maximum power of station E,
$M = 2B_{12}$ times the assumed maximum power of station M,
$L = 2B_{13}$ times the assumed maximum power of station L, and
$I = 2B_{14}$ time twice the assumed maximum power passing through the interchange in either direction.

*Simplified bridge circuit*

To solve Equation 2, I provide a circuit of the form illustrated in Fig. 3. Also, since a separate circuit of this form is necessary for solving the corresponding equation for each of the other stations and the interchange, I provide the circuit of Fig. 1 which, by means of switches, provides means for readily solving each of the equations in succession. These circuits are discussed in detail below.

An understanding of the circuit according to this invention may be gained from first considering Fig. 2 which represents a simplified case. There is provided a bridge circuit 12 having a suitable alternating or direct current source 14 and a current measuring device 16 such as a microammeter or the like having the usual protective features such as a relatively large series resistance and shunting switch therefor, as is well known in the art. The source is connected between the brushes of two potentiometers P of equal resistance, these brushes being mechanically coupled as indicated by dotted lines so that they move over their respective windings in unison. The current measuring device 16 is connected between the brushes of potentiometers L and E. Fixed resistances A, B and K are also provided. An assigned zero position for the potentiometers P intermediate their ends separates portions $aP$ and $bP$, where "$a$" and "$b$" are decimals between "0" and "1." The potentiometers E and L are assigned zero positions at their ends, as shown.

We may impose on this circuit the condition that the currents in the two branch circuits of the bridge shall be equal when it is in balance, that is, when the current through the device 16 is zero. The equation expressing the equality of the currents is given by (3)
$$pP + aP + K + L + B + bP - pP = bP - pP + A + E + aP + pP$$

where "$p$" is the fraction of resistance P between the zero position and the brush. This simplifies to the expression (4) $\qquad K + L + B = A + E$ The equation expressing the condition of balance where the branch currents are equal is given by (5) $\qquad eE + aP + pP = cL + B + bP - pP$ where "$e$" and "$c$" are the fractions of resistance E and L, respectively, between the zero positions and the brushes. This simplifies to the expression (6) $\qquad p(2P) = cL - eE + (bP - aP + B)$ We observe that Equation 6 is in the form of a sum of linear variables, as is Equation 2, and that the condition of balance with equal branch currents imposes an adjustment on the potentiometers P which is proportional to the sum of linear functions of the independent variables "$c$" and "$e$" and a constant term. This circuit would therefore be adequate to solve an incremental transmission loss equation of the form appropriate to a power system having only two power stations, or one station and an interchange where power is always incoming, or two interchanges where power is always incoming.

Bridge circuit of Fig. 3

Referring now to Fig. 3, there is shown a modification of the bridge circuit which accommodates not only additional linear terms for a more complex system, but also the possibility of outgoing power at an interchange. The circuit is shown with shunts $S_1$, $S_2$, $S_3$ and $S_4$, but for purposes of a preliminary explanation the four switches "$s$" in the circuits of these shunts are first assumed to be open.

In the circuit of Fig. 3, there are provided two potentiometers M having their brushes coupled to move in unison, as indicated by a dotted line. The zero position is at one end of each potentiometer. Similarly there are provided two equal, coupled potentiometers L, two equal, coupled potentiometers E, and two equal, coupled potentiometers I. All of these have their zero positions at one end, except for the I potentiometers which have their zero positions in the centers of their respective windings. The potentiometers P and the fixed resistors A, B and K are similar to those of Fig. 2.

We may impose on the circuit of Fig. 3 the condition that the currents in the two branch circuits of the bridge shall be equal when it is in balance. The equation expressing the equality of the currents is given by (7) $pP + aP + K + L + M + B + bP - pP$
$\qquad = bP - pP + A + E + I + aP + pP$ where "$p$" is again the fraction of resistance P between the zero position and the brush. This simplifies to the expression (8) $\qquad K + L + M + B = A + E + I$ The equation expressing the condition of balance where the branch currents are equal is given by (9)
$$\frac{I}{2} \pm \frac{iI}{2} + eE + aP + pP = mM + cL + B + bP - pP$$

where "$m$," "$c$" and "$e$" are the fractions of resistances M, L and E, respectively, between the zero positions and the brushes, and "$i$" is the fraction of $I/2$ between the zero position and the brush. This simplifies to the expression

(10)
$$-p(2P) = eE - mM - cL \pm \frac{iI}{2} + \left(aP - bP - B + \frac{I}{2}\right)$$

We note that Equation 10 is in the same form as Equation 2 except that the units of E, M, L and I are power in the case of Equation 2 and ohms in the case of Equation 10. Therefore, the circuit of Fig. 3 may be used to solve Equation 2 by null-point detection.

A numerical example showing the application of the circuit of Fig. 3 is as follows. In Equation 2 assume that E, M, L, I and $B_{10}$ are 16, 6, 3, 4 and ($-1$), respectively. Equation 2 then takes the form

(11) $\qquad \dfrac{dP_\mathrm{L}}{dP_1} = 16e - 6m - 3c \pm 2i - 1$

This equation is to be solved by the circuit of Fig. 3.

Referring to Fig. 3, if we define one ohm as representing one unit of Equation 2, the corresponding resistances are assigned the values above indicated. We may further assume that the range of values of incremental transmission loss between limiting positions is from $-5$ to $+15$. We then define

(12) $\qquad aP + bP \equiv P \equiv 10$ ohms, or one-half this total range

The values of fixed resistances A, B and K are next found as follows. Assume that the potentiometers are set at the positions in which "$m$," "$c$," "$e$" and "$i$" are each zero, and that the bridge will balance under the corresponding conditions that

(13) $\qquad bP - pP = 2$ and

(14) $\qquad aP + pP = 8$

Since the branch currents are to be made equal when the bridge is balanced, the branch resistances from the respective leads of the detecting device 16 to the lower voltage lead must be equal. This leads to the expression

(15) $\qquad B + 2 = 2 + 8$, or $B = 8$ ohms.

The branches must also have equal resistance, thus satisfying Equation 8:

(16) $\qquad K + 3 + 6 + 8 = A + 16 + 4$ from which $K = A + 3$. This condition is satisfied by assigning the values $K = 3$ ohms and $A = 0$.

According to Equation 11, the value of the incremental loss should be indicated at ($-1$) for the case assumed. Therefore a scale provided on the potentiometers P may be set to read "$-1$" at the position in which the bridge balances as described above. The zero position of the potentiometer P is found by noting from Equation 10 that

(17) $\qquad aP - bP - B + \dfrac{I}{2} = -1$

Since $(a+b) = 1$, we readily find that

(18) $\qquad a = \tfrac{3}{4}$ and $aP = 7.5$ ohms

Also

(19) $\qquad b = \tfrac{1}{4}$ and $bP = 2.5$ ohms

The distance in ohms between the scale readings "0" and "−1" is therefore 0.5 ohm. This will allow for a full scale range of −5 to +15, as required, and the reading is directly in the desired units of incremental loss. If Equation 11 gives the incremental loss in percent, the scale is calibrated in units of "percent incremental transmission loss."

The practical realization of the circuit of Fig. 3 as derived above is ordinarily complicated by the fact that the constants of Equation 2 yield values for the potentiometers that are not available in stock sizes. According to another feature of the bridge circuit according to this invention, use is made of the fact that the readings from the scale of the potentiometers P are taken when the detecting device 16 carries no current. Thus for example, if the given value I should fall between two stock potentiometer sizes, we may select for the I potentiometers the next larger stock size and shunt this with a fixed resistance or group of resistances $S_4$. The value of resistance $S_4$ is chosen so that the shunted value of the potentiometer equals the given value of I. By the same technique, the potentiometers representing E are chosen from a convenient larger stock size and a shunt resistance $S_3$ is provided which yields a total shunted resistance value equal to the given value of E plus the given value of I. The procedure with shunts $S_1$ and $S_2$ is exactly the same, and hence the bridge may be constructed with stock-size potentiometers M, L, E and I regardless of the constants in Equation 2. It will be understood that the use of the shunts is made possible only because the variable brushes of the potentiometers which they shunt do not draw current at the condition of balance. Of course, the potentiometers P may not be shunted, but instead, a convenient value of P is found to correspond with a full scale range which will cover the practical limits expected in operation of the power system.

It will be understood that, while the above example is based upon assigning the value of one ohm to one unit of Equation 2, a proportionality factor other than "1" may be employed if this is preferred.

It will be further recognized that the method by which the number of variables may be increased, as revealed by comparing Fig. 2 with Fig. 3, may be indefinitely extended, and hence power systems of any number of generating stations and interchanges may be accommodated.

Also, like other bridge circuits, the circuits according to this invention are not sensitive to variations in the voltage of the source 14 because the readings are taken when a null is reached.

*Multiple bridge circuit*

Fig. 1 is a schematic circuit diagram showing a single, five position selector switch SW with sixteen sets of contacts and five contacts per set or any equivalent switch. Four of the positions are marked "E," "L," "M" and "I," respectively. The fifth, unmarked position is "off." The pairs of potentiometers E, L, M, I and P correspond with like potentiometers in Fig. 3. Banks of resistances marked "$S_1$," "$S_2$," "$S_3$" and "$S_4$" correspond, respectively, to similarly-designated shunt resistors of Fig. 3. Fixed resistors such as $A_M$, $A_E$, $B_M$ and $B_E$ correspond to the resistors A, K and B of Fig. 3.

A series resistor $R_S$ and switch $S_S$ are provided for the current indicating-device 16 as noted above. The switch $S_S$ is left open until the bridge is nearly balanced to protect the device 16, in accordance with usual practice.

Thus with the switch SW set at "E" the circuits are connected to solve the equation corresponding to Equation 2 for "E" Station if the potentiometers E, L, M and I are set at positions proportional to their existing power outputs. After the bridge is balanced by adjustment of the potentiometers P, the switch SW is set at "L." Without changing the potentiometers E, L, M and I the bridge is again balanced to obtain the incremental transmission loss for "L" Station, and so on for each station and the net interchange.

It will be seen that once the potentiometers E, L, M and I are set to indicate the existing load allocation, the incremental loss for each station and the interchange may be found as rapidly as the switch SW is turned, the bridge balanced and the reading on the "incremental loss" scale on the potentiometer P taken at each position. The instrument therefore greatly simplifies the task of computation of Equation 2 and produces accurate results which are helpful in determining the most economical allocation of power in a given system at given load levels.

It will be understood that, while the invention has been described above with reference to embodiments for solving specific equations of the type of Equation 2, it is by no means limited to bridge circuits for such specific equations, but includes other circuits and modifications thereof within the spirit and scope of the above teachings insofar as such circuits will occur to those familiar with this art in applying such teachings to particular system applications.

Having thus described the invention, I claim:

A bridge circuit having, in combination, a number of potentiometers connected to form a closed loop, including two non-adjacent potentiometers having their brushes mechanically coupled and connected to the terminals of a source of current, and two circuits connecting the ends of said non-adjacent potentiometers to form said loop, each of said circuits having a first pair of equal potentiometers each having an open end, the brushes of said first pair being mechanically connected, and a second pair of equal potentiometers each having an open end and an end connected to a brush of said first pair, the brushes of said second pair being connected together mechanically and electrically, and a current indicating device connected between said electrically-connected brushes in each of said circuits.

References Cited in the file of this patent

UNITED STATES PATENTS

| | | |
|---|---|---|
| 2,410,651 | Glass | Nov. 5, 1946 |
| 2,431,696 | Keister | Dec. 2, 1947 |
| 2,443,098 | Dean | June 8, 1948 |

OTHER REFERENCES

The Review of Scientific Instruments, vol. 8, No. 8, August 1947, page 564.